(12) United States Patent
Singla et al.

(10) Patent No.: US 8,230,052 B2
(45) Date of Patent: Jul. 24, 2012

(54) MODULE DIAGNOSTIC TOOLKIT FOR CLIENT-SERVER BASED PROTOCOLS

(75) Inventors: Kanwaljeet Singla, Bellevue, WA (US);
Ciprian Gociman, Redmond, WA (US);
Mete Goktepe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 11/675,053

(22) Filed: Feb. 14, 2007

(65) Prior Publication Data

US 2008/0195752 A1 Aug. 14, 2008

(51) Int. Cl.
*G06F 15/173* (2006.01)
*G06F 15/16* (2006.01)

(52) U.S. Cl. ........ 709/223; 709/224; 709/227; 709/230; 709/231; 709/234; 709/236; 709/246; 709/247

(58) Field of Classification Search .................. 709/223, 709/224, 227, 230, 231, 232, 246, 247
See application file for complete search history.

(56) References Cited

U.S. PATENT DOCUMENTS

| | | | | |
|---|---|---|---|---|
| 5,778,170 | A * | 7/1998 | Chao | 714/40 |
| 5,964,891 | A * | 10/1999 | Caswell et al. | 714/31 |
| 6,714,976 | B1 * | 3/2004 | Wilson et al. | 709/224 |
| 6,738,933 | B2 * | 5/2004 | Fraenkel et al. | 714/47.2 |
| 2003/0018827 | A1 * | 1/2003 | Guthrie et al. | 709/318 |
| 2003/0135786 | A1 * | 7/2003 | Vollmar et al. | 714/25 |
| 2005/0044531 | A1 * | 2/2005 | Chawla et al. | 717/122 |
| 2005/0050159 | A1 * | 3/2005 | Suraski | 709/217 |
| 2005/0050164 | A1 * | 3/2005 | Burd et al. | 709/217 |
| 2005/0050189 | A1 * | 3/2005 | Yang | 709/223 |
| 2005/0050190 | A1 * | 3/2005 | Dube | 709/223 |
| 2005/0086644 | A1 * | 4/2005 | Chkodrov et al. | 717/124 |
| 2006/0235947 | A1 * | 10/2006 | Gray et al. | 709/218 |

OTHER PUBLICATIONS

"Internet Information Services Diagnostic Tools," Microsoft Windows Server 2003 R2, Published Apr. 12, 2005, updated Jan. 16, 2006, available at http://www.microsoft.com/windowsserver2003/iis/diagnostictools/default.mspx (PDF enclosed entitled "Document 1"), 5 pgs.

"NetInfo is a Diagnostic Tool Kit and Network Information Viewer Utility," Tsarfin Computing, available at http://www.ntsweden.se/arkiv/IPMonitor%20%20%20NetInfo/Produktblad/NetInfo.pdf (PDF enclosed entitled "Document 2"), 3 pgs.

"Sun Java System Active Server Pages 4.0," available at http://www.sun.com/software/chilisoft/features_benefits.xml (PDF enclosed entitled "Document 3"), 5 pgs.

* cited by examiner

*Primary Examiner* — Kevin Bates
*Assistant Examiner* — Mohammed Ahmed
(74) *Attorney, Agent, or Firm* — Workman Nydegger

(57) ABSTRACT

This paper describes a server diagnostic module toolkit which provides for the non-intrusive inspection and/or data transformation of stages, modules, and data on a server utilizing a request-response protocol. Diagnostic modules are installed on a server so that diagnostic commands may be sent by a client within an otherwise normal request and received by the server to invoke debugging and monitoring functionality during the normal runtime processing of the server. Diagnostic data may then be stored and later retrieved so that debugging and monitoring may be accomplished without disturbing the normal processing of requests by the server.

11 Claims, 3 Drawing Sheets

MODULE DIAGNOSTIC TOOLKIT FOR CLIENT-SERVER BASED PROTOCOLS

CROSS-REFERENCE TO RELATED APPLICATIONS

N/A

BACKGROUND

Computer networks have enhanced our ability to communicate and access information by allowing one computer or device to communicate over a network with another computing system using electronic messages. Typical communications between computing systems rely on a client-server relationship, where the client sends a request for services offered by a server and the server performs the desired function. Of course, the communications are governed by various protocols and other requirements such as authentication, authorization, security concerns, etc.

One common protocol used in the client-server relationship provides a series of restrictions on how messages are received and processed. Such protocols are commonly referred to as "request-response" type protocols, which include such specifications as the hypertext transfer protocol (HTTP) series (including standard HTTP, secure HTTP, reliable messaging HTTP, etc.), the file transfer protocol (FTP) series (including standard FTP, secure FTP, etc.), simple network management protocol (SNMP), and others. As the name implies, these protocols in general rely on the client sending a "request" message and the server responding on the same channel or port with a "response", even if the response is a simple acknowledgment of the receipt of the request.

In recent years, servers supporting such request-response protocols have evolved from monolithic entities into groups of specialized modules where the functionality of the server is broken up into specialized pieces that can be removed, replaced with new ones, and, in general, provide the capability of extending the server's functionality. In order to make this possible, the servers have exposed a set of application program interfaces (APIs), which provide access to various server data structures for allowing the manipulation of a client request and the server's response thereto. In order to facilitate this modular model of operation, servers have a number of stages (e.g., an authentication stage to authenticate the user, a logging stage to log results, etc.) where data may be read or altered. Modules can be developed and installed on the server which subscribe to particular stages on the server to have their functionality executed in one or more of these stages. Using this model, server functionality is easily extendible, flexible, scalable, and available, thus providing for a more robust service as desired by developers and others using the server resources.

As new modules are developed for a server, it becomes critical to properly test and troubleshoot the modules to find errors and tune performance—both during development and after deployment. A large challenge in testing and troubleshooting modules in servers, however, comes from the fact that the data which the server maintains, manipulates, and provides can be altered by any module during various stages in which they are executed. Since multiple modules can execute during the same stage (e.g., when a user is authenticated), it is difficult—if not impossible—to determine which particular module is at fault when an error occurs or which module might be responsible for a particular change in data. In some cases, it is even difficult to determine the stage in which a particular error or data change may have occurred.

It is also cumbersome and problematic in a typical development and debugging cycle to develop module-specific debug code, compile a module with debugging code or statements, deploy the altered module onto the server, and run a test. This code-compile-test-debug cycle may take an inordinate amount of effort and time, since in order to monitor certain behavior in different stages using various modules each scenario must independently be designed for and implemented. This typical method of debugging may also be problematic in that a module, which has been altered and compiled with inserted debugging code, often behaves differently than an unadulterated module. Accordingly, a particular error or result may not manifest itself or otherwise occur during execution of a module with such debug code—as opposed to a module that had not been altered.

BRIEF SUMMARY

The above-identified deficiencies and drawbacks of current testing and debugging systems that utilize request-response protocols are overcome through example embodiments of the present invention. For example, embodiments described herein provide for utilizing diagnostic modules within a server's request pipeline that can, during normal server runtime, perform diagnostic functions in a non-intrusive manner (i.e., without affecting normal operations or performance of the server). Any diagnostic data produced from performing such diagnostic functions may then be saved and subsequently retrieved as desired. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As briefly mentioned above, one example embodiment provides for using diagnostic modules in order to allow non-intrusive diagnostic inspection and data transformation within a server. In such embodiment, an otherwise normal request within a request-response protocol is received by the server, which contains a request pipeline and has diagnostic modules installed on it. The server then executes a diagnostic module, which has subscribed to one or more of the stages within the request pipeline and passes the diagnostic commands contained in the request to it. Based on the diagnostic command, the diagnostic module executes a corresponding function that performs an inspection or a data transformation of internal data structures within a desired stage in order to monitor performance and/or functionality of the modules installed on the server. The data resulting from the inspection or transformation, above, may then be stored in an in-memory log store for later retrieval.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
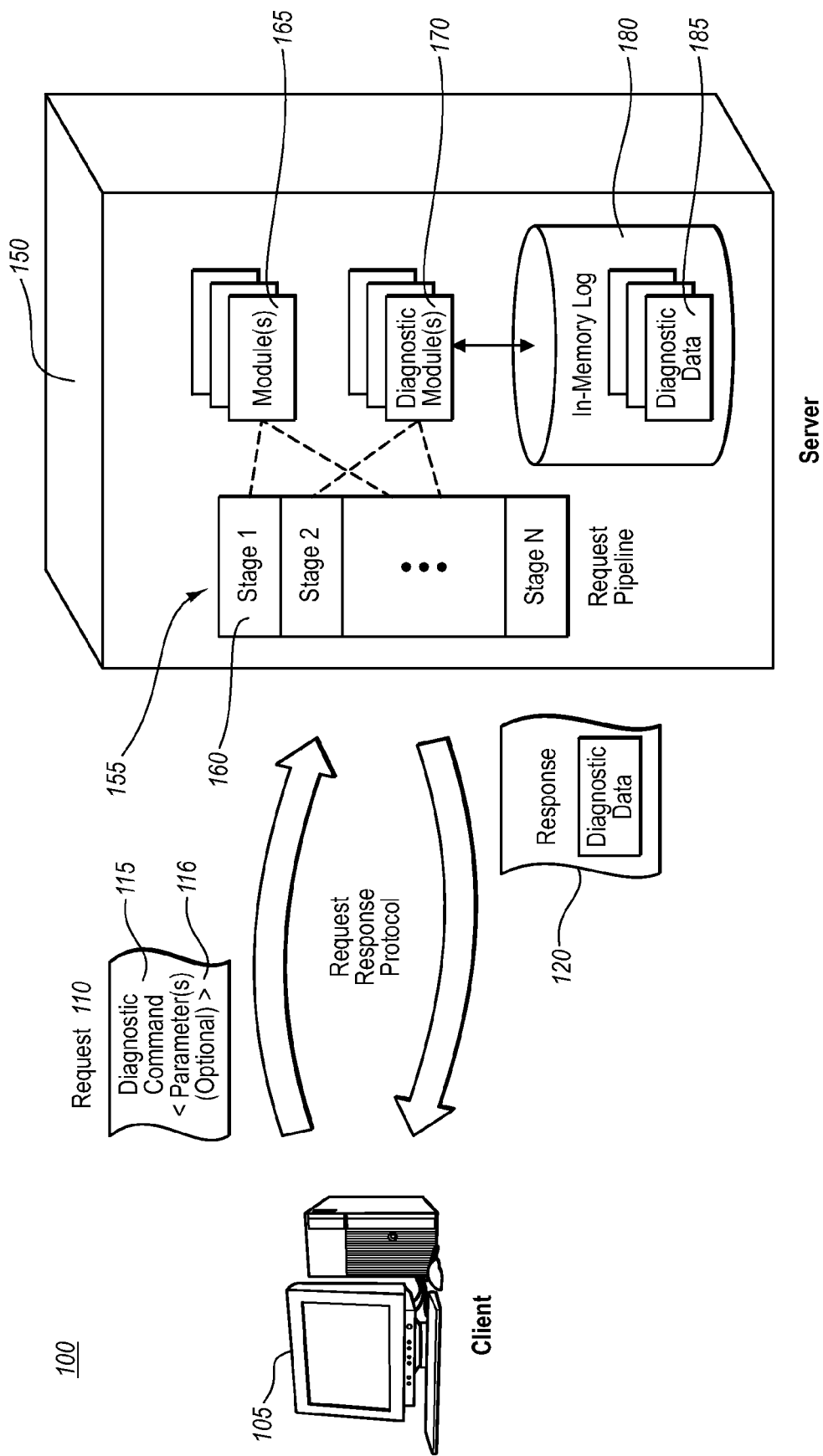
FIG. 1 illustrates an example computing environment that utilizes a server module diagnostic toolkit in accordance with example embodiments.

The present invention extends to methods, systems, data structures, and computer program products for non-intrusively inspecting and transforming data on a server employing a request-response protocol and using a stage and module architecture. The embodiments of the present invention may comprise a special purpose or general-purpose computer including various computer hardware or modules, as discussed in greater detail below.

As noted above, there are several problems associated with debugging and testing modules in modern servers, which are organized using a request pipeline with various stages and modules that subscribe to and service such stages. For example, the normal code-compile-test-debug cycle can be both time consuming and cumbersome. Such testing may also produce erroneous results because the altered modules may change the very debugging, inspection of data, and monitoring of performance desired.

In order to overcome these and other problems, embodiments herein provide for diagnostic modules, which when installed on the server can inspect or transform data of various modules in a non-intrusive way during normal processing. These diagnostic modules are then executed using diagnostic commands, which are included within a normal request from the client. The requests may also include any parameters or other information necessary for proper execution of the diagnostic modules in any of the various stages of the request pipeline. The diagnostic modules installed on the server then identify the request as including such diagnostic information and invokes the desired functionality. The various functions invoked inspect and/or otherwise perform data transformations on various data structures in various stages within the server. Diagnostic data resulting from the inspection and/or data transformation may then be stored within an in-memory log store. A request that includes another diagnostic command may then be sent to retrieve such diagnostic data from the memory log store, which can then be returned in the response to the client for diagnostic analysis.

Note that by performing the diagnostic functionality in components separate from the modules handling normal server processing, the server may operate normally and without effect (or with little effect) from the diagnostic processing. Furthermore, by installing diagnostic modules that inspect data and monitor performance within stages of the request pipeline, the cumbersome code-compile-test-debug cycle may be reduced or even completely avoided.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

As noted above, embodiments of the present invention enable the non-intrusive diagnostic inspection and data transformation within a server's request pipeline. The present invention overcomes problems with the typical code-compile-test-debug cycle used to develop and debug server modules, which can be problematic because of time and effort required in the cycle to compile and deploy debug code.

FIG. 1 illustrates a typical client-server relationship utilizing a request-response protocol. As previously mentioned, a client 105 will typically send a request 110 to the server 150 and the server will process the request through a request pipeline 155, generate a response 120 to the received request, and return it to the client 105. The server 150 is organized using a request pipeline 155, which is divided into one or more stages 160. Each stage 160 within the request pipeline 155 generally handles a certain type of functionality, e.g., authorization, authentication, data encryption, file services, etc. Further, each module 165 can subscribe to one or more stages within the pipeline to provide one or more particular functions employed by that stage 160 on the server.

For example, one stage 160 might be an authentication stage and a module 165, which subscribed to the authentication stage, might enable password access protocol (PAP) authentication functionality. Another module 165 subscribed to the authentication stage might enable challenge-handshake access protocol (CHAP) authentication functionality. Still another module 165 subscribed to the authentication stage might enable extensible authentication (EAP) authentication functionality. Of course, any number of functionality or modules may be invoked in any number of stages within the pipeline and same module may subscribe to multiple stages providing functionality to service multiple stages. Accordingly, by installing and including various modules 165 subscribed to any (or all) of a server's pipeline stages 160, the server enables robust and extensible functionality within the request-response protocol.

FIG. 1 also illustrates example embodiments that provide for diagnostic modules 170 installed on the server that subscribed to at least one stage 160 within the request pipeline 155. In such an embodiment, client 105 may identify module (s) 165 and/or stage(s) 160 for which diagnostic information is desired. As such, the client 105 will include a diagnostic command 115 within the request 110, which is then sent to the server 150.

As will be appreciated, the diagnostic command 115 will be used to invoke one or more functions (e.g., command handlers) of the diagnostic modules 170 residing on the server 150. Such specific functionality implemented by the diagnostic modules 170 may include inspecting parameters passed into and/or out of a module 165 resident on the server 150. Similarly, the functionality may include inspecting data passing into and/or out of any particular stage 160 within the request pipeline 155. The functionality may also include data transformations such as setting parameters or data used by various modules 165 and/or stages 160 within the pipeline 155.

Of course, there are numerous implementations that may be performed by diagnostic modules 170 for inspection and/or data transformations of any number of modules 165 within any number various stages 160. For example, as described below the diagnostic command 115 may turn diagnostic modules 170 on or off, subscribe diagnostic modules 170 to various stages 160, or perform any number of desired diagnostic analyses. As such, the phrase "inspection and/or data transformation" should be broadly construed herein to include any monitoring, recording, data conversion, data manipulation, parameter setting, module manipulation, etc., for any input and/or output of any module 165 within any number of stages 160.

Command handlers, implementing specific functionality within diagnostic modules, which are desired to be invoked can be designed to be flexible by accepting some parameters which can then be used in the command handler code. The request 110 may also include optional parameters 116 along with diagnostic command, which may be then be passed to command handlers. Similar to the diagnostic commands 115, the parameters or arguments 116 may include any wide variety of information and can be used by the corresponding command handler. Further, as discussed in greater detail below, it should be noted that typically the request 110 will include the diagnostic command 115 and (optionally) arguments 116 in the header(s) 310 of the request 110; however, they may also be included in other portions of request 110, e.g., the body 315.

The client 105 then sends the request 110 to the server 150 that includes a diagnostic command 115 for invoking a function or command handler of a diagnostic module 170. When the diagnostic module 170 recognizes the message 110 as including a diagnostic command 115 which it understands, it may then pass the command information (including the command 115 and optional parameters 116) to the corresponding command handler for execution, which will inspect data and/or perform a data transformation as previously described. In response to the diagnostic command 115, the diagnostic module may also record diagnostic data 185 within an in-memory log store 180 for later retrieval. Accordingly, another diagnostic command 115 included within another request 110 may also instruct a particular diagnostic module 170 to retrieve previously stored data 185 from the in-memory log store 180. The diagnostic module may then format a response 120 of the request-response protocol, which includes the diagnostic data 185 retrieved from the store 180. This diagnostic data 185 is then sent to the requesting client 105 for further analysis. Note that although the diagnostic data 185 is shown as being stored on the server 150, the data store 180 may reside elsewhere.

As mentioned above, a client may also format similar requests 110 containing diagnostic commands which will cause a previously installed diagnostic module 170 (or even a standard module 165) to be enabled or disabled. In such a fashion, a diagnostic module 170 (or module 165) may be deployed in the field and enabled (i.e., turned on) or disabled (i.e., turned off) remotely. Such functionality may be invaluable to debugging and performance profiling for servers deployed within the field but where developers or systems support remain remote. Controlling the diagnostic functionality, recording diagnostic data, retrieving diagnostic data, and enabling/disabling diagnostic functionality remotely may provide tremendous benefits over now-typical debugging procedures.

The above described embodiments provide the capability of inspecting and debugging without altering the otherwise normal processing of requests within the server's 150's request pipeline 155. In particular, a normal request may be received by the server 150 which processes the request and produces a response in a completely normal fashion with the non-intrusive addition of a diagnostic inspection of data and the recording of diagnostic data 185 within the in-memory log store 180.

Figure 3:
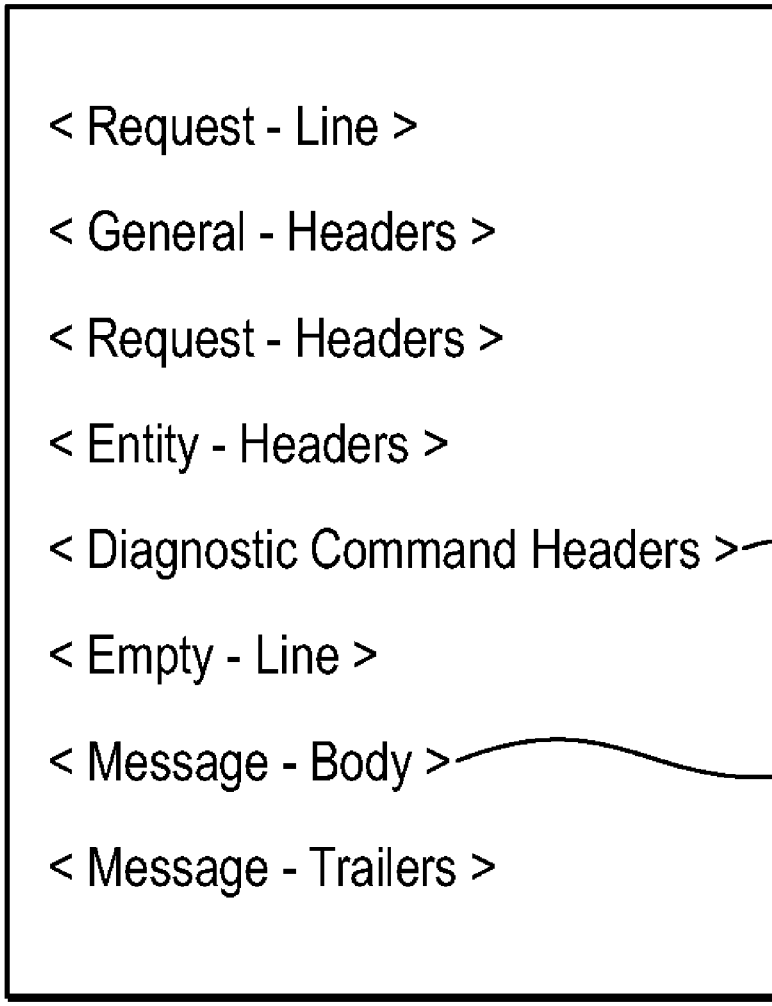
FIG. 3 illustrates an example request packet format that may be utilized within a request-response protocol according to embodiments described herein.

FIG. 3 illustrates a typical request in a request-response protocol that may be formatted in accordance with example embodiments described herein. Examples of such protocols include (but are not limited to) HTTP, SHTTP, RHTTP, FTP, SFTP, SNMP, etc. Also, as previously mentioned, the diagnostic command may be included in any part of the request. In one embodiment, the diagnostic command is preferably included within a header 310 (which is likely ignored by other modules) so as not to affect normal processing of the request in any way. In another embodiment, the diagnostic command may be included within the message body 315 of the request.

For example, in an HTTP-like protocol, a request 305 including a diagnostic command 115 in the header(s) may look something like:

```
GET /path/file.html HTTP/1.0
From: someUser@somePlace.com
Host: XXX
User-Agent: HTTPBTool/1.0
COMMAND_NewDiagModule: BeginRequest GetResponseHeader PARAM
COMMAND_NewDiagModule: AuthRequest GetResponseHeader PARAM
COMMAND_NewDiagModule: PostAuthRequest GetResponseHeader
```

```
PARAM
COMMAND_NewDiagModule: EndRequest GetResponseHeader
PARAM
[blank line here]
```

Upon receiving the request, the server may identify the diagnostic commands included within the request, execute one or more functions of a diagnostic module 170, and record diagnostic data 185 within the in-memory log store 180. After the above request is received and processed on the server, another request 110 may be sent to the server to retrieve the data 185, which in this example the diagnostic module 170 stored within the in-memory log store 180. The data returned by the response may look something like:

```
HTTB/1.0 200 OK
Date: Wed, 31 Jan 2007 23:59:59 GMT
Content-Type: text/html
Content-Length: 1354
<html>
<body>
{[5-7-5-1-
6:NewDiagModule:1:(BeginRequest))][FAIL]GetResponseHeader
[PARAM][<null>]}
{[5-7-5-1-
6:NewDiagModule:1:(AuthRequest))][FAIL]GetResponseHeader
[PARAM][<null>]}
{[5-7-5-1-
6:NewDiagModule:1:(PostAuthRequest))][FAIL]GetResponseHeader
[PARAM][<null>]}
{[5-7-5-1-
6:NewDiagModule:1:(EndRequest))][SUCCESS]GetResponseHeader
[PARAM][<value>]}
(more contents)
...
</body>
</html>
```

As the above embodiments have illustrated, a diagnostic command 115 may be directed toward a specific diagnostic module (e.g., NewDiagModule) and direct the inspection and/or data transformation toward a module 165 and/or specific stage 160 (e.g., PostAuthRequest) within the request pipeline 155. Examples of such stages might include Begin Request, Auth Request, Post Auth Request, Acquire Request State, Log Request, Map Path, Send Response, among many others. Note also, that the diagnostic module(s) 170 may support a base set of command handlers or functions by default and provide a way to extend the list of functions by adding more command handlers. Further note, the diagnostic modules 170 may subscribe to any number of pipeline 155 events or stages 160 and may have a default set (e.g., all stages 160). Note, however, that commands 115 or other mechanism may be provided for overriding the subscription list.

In the above example, GetResponseHeader corresponds to a particular command handler, which may be implemented within a diagnostic module. Such a command handler would enable specific functionality within a diagnostic module to perform particular diagnostic tasks including inspection and/or data transformations of a module 165. Further, in the above example, GetResponseHeader may invoke a command handler which would inspect the response header and record a particular parameter (e.g., PARAM) contained within the header. As the example illustrates, the diagnostic command is directed toward a particular stage 160 of the request pipeline (e.g., PostAuthRequest).

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams within FIG. 2—is used to indicate the desired specific use of such terms.

Figure 2:
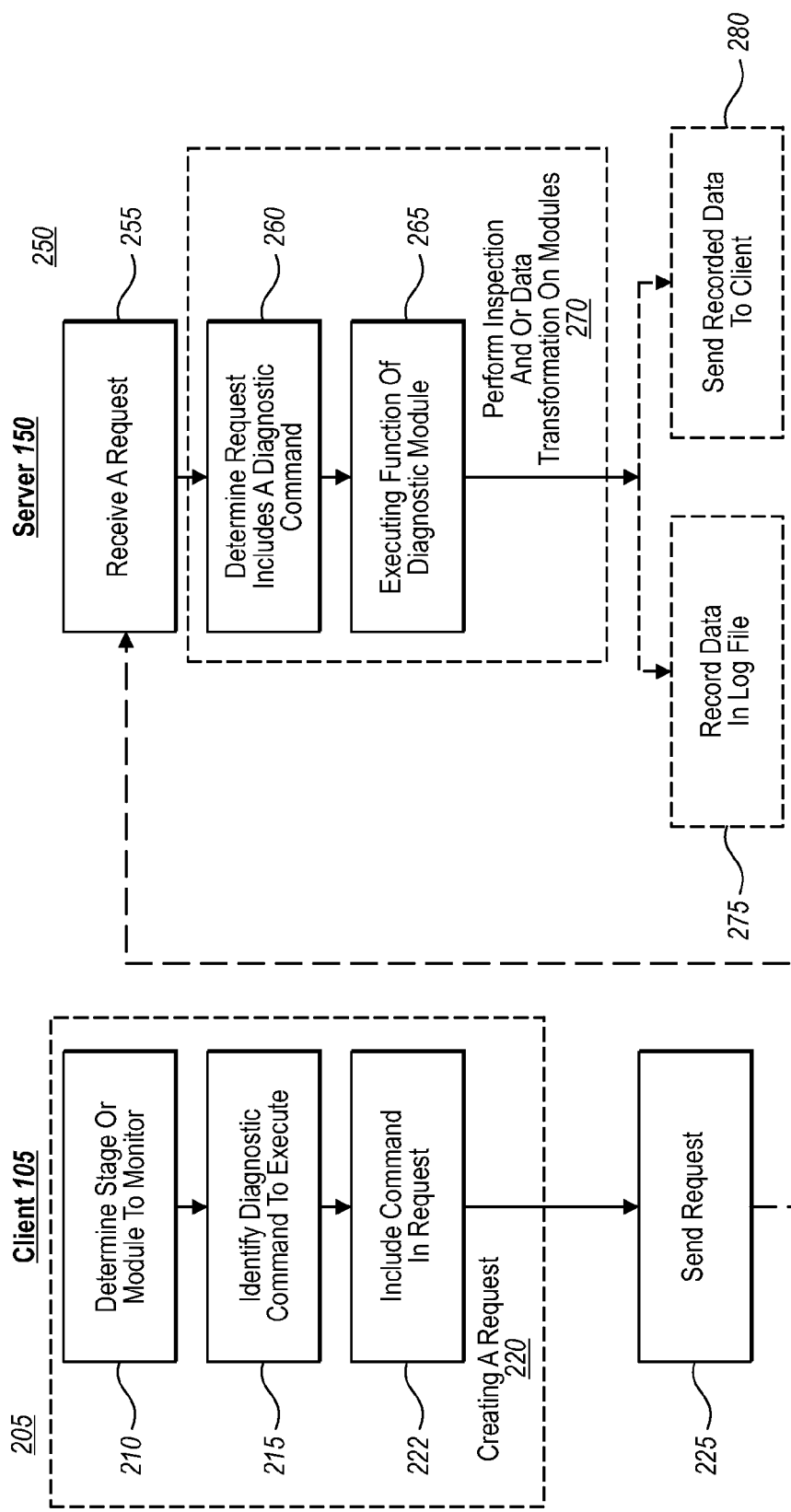
FIG. 2 illustrates an example flow diagram for inspecting and/or server data transformation of modules in accordance with example embodiments.

As previously mentioned, FIG. 2 illustrates flow diagrams for various exemplary embodiments of the present invention. The following description of FIG. 2 will occasionally refer to corresponding elements from FIGS. 1 and 3. Although reference may be made to a specific element from these Figures, such references are used for illustrative purposes only and are not meant to limit or otherwise narrow the scope of the described embodiments unless explicitly claimed.

As noted previously, FIG. 2 illustrates a flow diagram for various exemplary embodiments of the present invention. The following description of FIG. 2 will occasionally refer to corresponding elements from FIGS. 1 and 3. Although reference may be made to a specific element from these Figures, such references are used for illustrative purposes only and are not meant to limit or otherwise narrow the scope of the described embodiments unless explicitly claimed.

FIG. 2 illustrates an example flow diagram from a client 105 perspective and from a server 150 perspective of methods 205 and 305 for invoking or allowing the inspection and/or server data transformation of server modules for a request pipeline in a runtime, non-intrusive manner. From the client side 105, method 205 includes a step for 220 creating a request. For example, client 105 may create a request 110 to be sent to server 150 that utilizes a request-response protocol and executes a plurality of modules 165 that perform particular functions within various stages 160 of a request pipeline 155. Note that the request-response protocol may be HTTP, SHTTP, RHTTP, FTP, SFTP, SNMP, etc.

Step for 220 includes an act 210 of determining a stage or a module to monitor in the request pipeline. For example, client 105 may determine one or more stages 160 and/or modules 165 on server 150 to monitor. The stage 160 and/or module 165 may be any stage or module within the server 150.

Step for 220 also includes an act of identifying 215 a diagnostic command for executing functionality of diagnostic module(s) that subscribe to a stage within the request pipeline. For example, client 105 may identify a diagnostic command 115 for executing functionality of diagnostic module(s) 170 that subscribe to a stage 160 within the request pipeline 155. Note that when the diagnostic command 115 is received by the server 150, it causes the execution of various function(s) or command handler(s) of the diagnostic module(s) 170. Based on the execution of the function(s) of the diagnostic modules 170, an inspection and/or data transformation of modules 165 within stage(s) 160 is performed in order to monitor performance thereof.

Note that the execution of the function of the diagnostic modules 170 may comprise recording data about the inspection and/or the data transformation in a memory log store 180 at the server 150. Further, the execution of the function of the diagnostic modules 170 may comprise enabling or disabling a previously installed module 165, 170.

Step for 220 further includes an act of including 222 the diagnostic command in the request. For example, client 105 may include the diagnostic command 115 and optional parameters 116 within the request. The diagnostic command and/or optional parameters within the header of the message 110.

Finally, method 205 includes an act of sending 225 the request to the server. For example, once the request 110 has been created with the diagnostic command 170 included with any optional arguments 116, the message 110 can be sent to the server 150.

Once method 205 sends the request to the server, FIG. 2 now follows the server side method 250, which includes an act of receiving 255 a request at a server. More specifically, server 150 may receive a request 110 in a request-response protocol and execute a plurality of modules 165 that perform particular functions within one or more stages 160 of a request pipeline 155.

Method 250 also includes a step for 270 performing inspection and/or data transformation of module(s) within a stage. More specifically, step for 270 includes an act 260 of determining that the request includes a diagnostic command. For example, server 150 may determine that request 110 includes a diagnostic command 115 and optional parameters 116 for executing functionality of one or more diagnostic modules 170 that subscribe to at least one stage 160 within the request pipeline. It should be noted that diagnostic modules 170, like the other modules 165 within the server 150, may subscribe to one or more stages 160 within the request pipeline 155.

Based on the diagnostic command, step for 270 further includes an act of executing function(s) of the diagnostic module(s) within stage(s) of the request pipeline. More specifically, based on the type of diagnostic command 115, functions or command handlers associated with the diagnostic modules 170 may be executed in order to perform an inspection and/or data transformation of modules 165 within stages 160 of pipeline 155 in order to monitor performance thereof.

The method 250 may optionally include an act of recording 275 diagnostic data 185 about inspection and/or data transformation in a memory log store 180 at the server 150. By this process, diagnostic data 185 about an inspection or data transformation may be stored in an in-memory log store 180 for later retrieval. This facilitates the diagnostic functionality and debugging to be non-intrusive on the normal processing of the server 150 and, particularly, within the modules 165 subscribed to stages 160 and operating within the request pipeline 155.

In the event that the method 250 stores diagnostic data 185, method 250 further includes an act of receiving 255 another request, determining 260 that the request includes a diagnostic command 115 for retrieving the recorded diagnostic data 185 about an inspection and/or data transformation from a memory log store 180; and sending 290 the recorded data 185 to a client 105 in a reply to the request based on the request-response protocol. In this way, a client 105 may retrieve diagnostic data 185 that was previously stored in an in-memory log store 180 by a diagnostic module 170 whose functionality had been invoked by a diagnostic command 115 sent in a previous request 110.

As previously noted, the diagnostic command 115 may also enable or disable a diagnostic module 170 and/or a normal module 165, which had been previously installed on a server. In this fashion, diagnostic modules 170 and/or normal module 165 may be installed on a server and then enabled (i.e., turned on) or disabled (i.e., turned off) remotely. This would facilitate a development or test engineer working at a remote client 105 to monitor the performance of a server 150 which had been deployed in the field or at a customer site. It would further enable the remote diagnosis of errors or problems in a non-intrusive manner while normal processing of the server continued.

Of course, it may be recognized that the number of diagnostic modules 170 installed on a server 150 need not be limited. There may be any number of diagnostic modules 170 installed and the diagnostic modules may be enabled or disabled by using diagnostic commands 115 within requests 110 sent from a client 105 at any time. Further, a diagnostic module 170 which is installed on a server 150 may also subscribe to any number of stages 160 within a request pipeline 155 or monitor any number of other modules 165 operating on the server.

Also as noted above, the diagnostic commands 115 sent to the server 150 may be included within any part of the request 110 which, itself, follows the normal format of the request-response protocol used by the server. In one embodiment, the diagnostic command 115 is included within a header 310 of the request 110. In another embodiment, the diagnostic command 115 is included within the message body 315 of the request. As can be appreciated, the present invention may be practiced within any request-response protocol. Such protocols, for example, include (but are not limited to) HTTP, SHTTP, FTP, SFTP, and SNMP.

It should also be recognized that one or more parameters 116 may be included with the message 110 sent by the client 105 and/or received by the server 150. Such parameters or arguments 116 may further enhance or limit functionality invoked by a particular diagnostic command 115 and executed by a diagnostic module 170 on a server 150.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a client-server computing environment, a method of allowing the inspection and/or server data transformation of modules for an HTTP request pipeline in a runtime, non-intrusive manner by providing a set of diagnostic modules that subscribe to various stages of the HTTP request pipeline and monitor module execution at any subscribed server stage therein, the method comprising:

receiving, from a client, a first HTTP request at a server that has an HTTP request pipeline and that executes a plurality of software modules that perform particular functions within one or more stages of the HTTP request pipeline;

the server also including a set of diagnostic modules, separate from the software modules, that subscribe to various stages of the HTTP request pipeline and monitor software module execution at any subscribed stage therein;

determining that the first HTTP request includes a diagnostic command in its header, the diagnostic command requesting the execution of one or more command handlers of one or more diagnostic modules that subscribe to at least one stage within the HTTP request pipeline;

based on the diagnostic command included in the first HTTP request, executing at least one function of the one or more diagnostic modules within the at least one stage of the HTTP request pipeline to perform an inspection, a data transformation, or both on data as the data passes through the at least one stage of the HTTP request pipeline to which the one or more diagnostic modules subscribe thereby enabling the inspection, data transformation, or both in a runtime, non-intrusive manner;

storing diagnostic data obtained from the inspection, the data transformation, or both in a log receiving, from the client, a second HTTP request at the server, the second HTTP request including a diagnostic command in its header that requests the retrieval of the stored diagnostic data;

and in response to the second HTTP request, retrieving and sending the diagnostic data to the client.

2. The method as recited in claim 1, wherein each stage within the HTTP request pipeline is subscribed to by one or more of the diagnostic modules.

3. The method as recited in claim 1, wherein the request further includes one or more parameters for use when executing the at least one function of the one or more diagnostic modules.

4. The method as recited in claim 1, wherein performing the inspection, the data transformation, or both, comprises inspecting parameters being passed to another module other than the one or more diagnostic modules of the plurality of modules.

5. The method as recited in claim 1, wherein executing the at least one function comprises enabling a previously installed module.

6. The method as recited in claim 1, wherein executing the at least one function comprises disabling a previously installed module.

7. In a client-server computing environment, a method of remotely invoking the inspection and/or server data transformation of server modules for an HTTP request pipeline in a runtime, non-intrusive manner the method comprising:

creating a first HTTP request to be sent to the server that has an HTTP request pipeline and that executes a plurality of software modules that perform particular functions within one or more stages of the HTTP request pipeline, the server also including a set of diagnostic modules, separate from the software modules, that subscribe to various stages of the HTTP request pipeline and monitor software module execution at any subscribed stage therein, creating the first HTTP request comprising:

determining a stage or a module in the HTTP request, pipeline which is to be monitored, identifying a diagnostic command for executing one or more command handlers functionality of one or more diagnostic modules that subscribe to at least one stage within the request pipeline, and including the diagnostic command in the header of the HTTP request;

sending the first HTTP request to the server wherein, when received by a server, the diagnostic command included in the header causes the execution of at least one function of the one or more diagnostic modules, and wherein, based on the execution of the at least one function of the one or more diagnostic modules, an inspection, data transformation, or both, of on data as the data passes through the at least one stage of the HTTP request pipeline to which the one or more diagnostic modules subscribe, and wherein based on the performance of the inspection, data transformation, or both, diagnostic data is stored in a log;

creating a second HTTP request to be sent to the server and including in the header of the second HTTP request a diagnostic command that requests retrieval of the stored diagnostic data; and receiving the diagnostic data from the server in response to the second HTTP request such that the diagnostic data is obtained in a runtime, non-intrusive manner.

8. The method as recited in claim 7 wherein executing the at least one function comprises enabling a previously installed module.

9. The method as recited in claim 7 wherein executing the at least one function comprises disabling a previously installed module.

10. A computer program product comprising a computer-readable storage device having encoded thereon computer-readable instructions, the instructions, when executed in a computing environment, perform a method comprising:

receiving, from a client, a first HTTP request at a server that has an HTTP request pipeline and that executes a plurality of software modules that perform particular functions within one or more stages of the HTTP request pipeline, the server also including a set of diagnostic modules, separate from the software modules, that subscribe to various stages of the HTTP request pipeline and monitor software module execution at any subscribed stage therein;

determining that the first HTTP request includes a diagnostic command in its header, the diagnostic command requesting the execution of one or more command of one or more diagnostic modules that subscribe to at least one stage within the request pipeline;

based on the diagnostic command included in the first HTTP request, executing at least one function of the one or more diagnostic modules within the at least one stage of the HTTP request pipeline-to perform an inspection, a data transformation, or both on data as the data passes through the at least one stage of the HTTP request pipeline to which the one or more diagnostic modules subscribe thereby enabling the inspection, data transformation, or both in a runtime, non-intrusive manner;

storing diagnostic data obtained from the inspection, the data transformation, or both in a log receiving, from the client, a second HTTP request at the server, the second HTTP request including a diagnostic command in its header that requests the retrieval of the stored diagnostic data; and in response to the second HTTP request, retrieving and sending the diagnostic data to the client.

11. The computer program product of claim 10, wherein the request further includes one or more parameters for use when executing the at least one function of the one or more diagnostic modules.

* * * * *